United States Patent
Zhang et al.

(10) Patent No.: US 9,106,429 B2
(45) Date of Patent: Aug. 11, 2015

(54) METHOD AND SYSTEM FOR PRE-ACCESSING CONFERENCE TELEPHONE AND NETWORK SIDE DEVICE

(75) Inventors: Baohua Zhang, Shenzhen (CN); Fangmin Deng, Shenzhen (CN); Song Yu, Shenzhen (CN); Tao Xue, Shenzhen (CN); Yaobin Cao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 13/640,357

(22) PCT Filed: Jan. 14, 2011

(86) PCT No.: PCT/CN2011/070270
§ 371 (c)(1),
(2), (4) Date: Oct. 10, 2012

(87) PCT Pub. No.: WO2012/024904
PCT Pub. Date: Mar. 1, 2012

(65) Prior Publication Data
US 2013/0142334 A1 Jun. 6, 2013

(30) Foreign Application Priority Data
Aug. 25, 2010 (CN) .......................... 2010 1 0265334

(51) Int. Cl.
*H04M 3/56* (2006.01)
*H04L 12/18* (2006.01)
(Continued)

(52) U.S. Cl.
CPC ........ *H04L 12/1822* (2013.01); *H04L 12/1827* (2013.01); *H04M 3/56* (2013.01);
(Continued)

(58) Field of Classification Search
CPC ............ H04L 63/0227; H04L 63/0245; H04L 12/1822
USPC .......................... 380/257; 726/4; 379/207.01
See application file for complete search history.

(56) References Cited

U.S. PATENT DOCUMENTS 4,958,153 A * 9/1990 Murata et al. ................. 370/462
5,033,079 A * 7/1991 Catron et al. ............. 379/93.14
(Continued)

FOREIGN PATENT DOCUMENTS

| CN | 1889767 A | 1/2007 |
|---|---|---|
| CN | 101370251 A | 2/2009 |
| CN | 101500229 A | 8/2009 |

OTHER PUBLICATIONS

Liu et al.—Voice over IP Signaling: H.323 and Beyond. Telcordia Technologies. IEEE Communications Magazine Oct. 2000. 7pg. http://ieeexplore.ieee.org/stamp/stamp.jsp?tp=&arnumber=874981.*

(Continued)

*Primary Examiner* — Jung Kim
*Assistant Examiner* — Ngoc D Nguyen
(74) *Attorney, Agent, or Firm* — Ling Wu; Stephen Yang; Ling and Yang Intellectual Property

(57) ABSTRACT

A method for pre-accessing a conference telephone is disclosed in the present invention. The method includes that: a network side detects a received call whose target is a main control party after the main control party initiates an encryption conference telephone; the call is not accessed if the call is a non-encryption conversation; the call is allowed to be accessed if the call is an encryption conversation. A system for pre-accessing a conference telephone is also disclosed in the present invention, wherein, the system includes a pre-accessing processing unit and a call type detection unit of the network side. A network side device is also disclosed in the present invention. The present invention realizes the pre-accessing of the encryption conference telephone, thereby improving security of the encryption conversation as well as avoiding the problem that a user is frequently affected when performing the encryption conference telephone.

14 Claims, 1 Drawing Sheet

(51) Int. Cl.
*H04W 12/02* (2009.01)
*H04W 12/08* (2009.01)

(52) U.S. Cl.
CPC ......... *H04W 12/02* (2013.01); *H04M 2203/50* (2013.01); *H04M 2203/5009* (2013.01); *H04M 2203/5027* (2013.01); *H04M 2203/5054* (2013.01); *H04M 2203/60* (2013.01); *H04W 12/08* (2013.01)

(56) References Cited

U.S. PATENT DOCUMENTS

| | | | | |
|---|---|---|---|---|
| 5,161,154 | A | * | 11/1992 | Diaz et al. ................... 370/341 |
| 5,353,351 | A | | 10/1994 | Bartoli et al. |
| 6,016,350 | A | * | 1/2000 | Funabe et al. ................ 713/153 |
| 6,084,969 | A | * | 7/2000 | Wright et al. ................ 380/271 |
| 6,757,823 | B1 | * | 6/2004 | Rao et al. ..................... 713/153 |
| 7,197,128 | B1 | * | 3/2007 | Stumm et al. ............. 379/211.02 |
| 7,324,645 | B1 | * | 1/2008 | Juopperi et al. ............. 380/247 |
| 7,577,837 | B1 | * | 8/2009 | Ithal et al. ................... 713/163 |
| 2002/0021791 | A1 | * | 2/2002 | Heilmann et al. ............ 379/189 |
| 2005/0108534 | A1 | * | 5/2005 | Bajikar et al. ................ 713/172 |
| 2009/0122984 | A1 | * | 5/2009 | Fascenda et al. ............. 380/247 |
| 2009/0190507 | A1 | * | 7/2009 | Li et al. ........................ 370/271 |

OTHER PUBLICATIONS

RLR—An Overview of Communication Manager Transport and Storage Encryption Algorithms. Avaya Inc. 2004. 9 pages. http://downloads.avaya.com/css/P8/documents/100017155.*
International Search Report for PCT/CN2011/070270 dated May 18, 2011.
"Integrated Media Gateways"; Dialogic IMG 1010/1004; Printable WebHelp, Release 10.3.x/10.5.x; Sep. 2008; www.dialogic.com.

* cited by examiner

METHOD AND SYSTEM FOR PRE-ACCESSING CONFERENCE TELEPHONE AND NETWORK SIDE DEVICE

TECHNICAL FIELD

The present invention relates to the field of the mobile communication technology, and in particular, to a method, system and network side device for pre-accessing a conference telephone.

BACKGROUND OF THE RELATED ART

The voice conversation is the most fundamental service of the mobile communication network and it is also the most important service, and also concerned by most users and operators. Its confidentiality and security are also one of important contents of the mobile network technology. At present, the mobile phone with the encryption conversation function receives more and more attentions, and especially the organizations and individuals, such as the sensitive department of the government, and the intelligence agency and so on, pay much attention to the security and confidentiality.

The conference telephone function of the mobile phone, based on its advantage of simple building and good mobility, is more and more widely used by people. The conference telephone is used mainly for three or more users to perform the conversation at the same time. For the initiator, the three-party conversation services have to be registered in the network side at first, and then it can be used.

The inventor of the application of the present invention finds that: the mobile phones with the encryption conversation function are basically based on the voice encryption and decryption from end to end at present, which does not need the network to participate, so it cannot perform the operation of encryption and decryption by using the security key encryption factor (Ki) in the network or the other keys generated by the Ki, such as the cipher key (abbreviated as CK) and so on.

In sum, the security of the current conference telephone service of the mobile phone is not high, and it is probably affected by other unknown non-encryption conversation.

SUMMARY OF THE INVENTION

The technical problem that the present invention solves is to provide a method, system and network side device for pre-accessing a conference telephone, to improve the security of the conference telephone service.

In order to solve the above-mentioned technical problem, the present invention provides a method for pre-accessing a conference telephone, comprising:

a network side detecting a received call whose target is a main control party after the main control party initiates an encryption conference telephone; if the call is a non-encryption conversation, then not accessing the call; if the call is an encryption conversation, then allowing to access the call.

Wherein, the step of a network side detecting a received call whose target is a main control party comprises:

if a call establishment message of the call comprises a call type and the call type is encryption, then the network side judging the call as an encryption conversation; otherwise judging the call as a non-encryption conversation.

Wherein, the call type is realized through a user—user information element (UUIE) field in the call establishment message, and when content of the UUIE field is "ENCRYPTION VOICE", that the call type is encryption is indicated.

The method further comprises:

after the encryption conference telephone enters a conversation state, a terminal and the network side of the encryption conference telephone performing encryption and decryption on voice data of the conversation according to the call type.

Wherein, the step of performing encryption and decryption on voice data of the conversation comprises:

a calling terminal using a cipher key (CK) of a sending party as an operational factor to encrypt uplink voice data, and uploading the encrypted voice data to the network side; and after the network side receives the encrypted voice data and after performing the decryption by using the CK of the sending party as the operational factor, then using the CK of a receiving party as the operational factor to encrypt the voice data, and sending the encrypted voice data to a called terminal; the called terminal using the CK of the receiving party as the operational factor to decrypt received downlink voice data.

The method further comprises:

after the network side allows to access the call, the main control party deciding whether to answer and join the call into this encryption conference telephone.

In order to solve the above-mentioned technical problem, the present invention further provides a system for pre-accessing a conference telephone, comprising a pre-accessing processing unit and a call type detection unit of a network side, wherein, the call type detection unit is configured to: after receiving a conference telephone initiated by a main control party, detect a received call whose target is the main control party, and transmit a detection result to the pre-accessing processing unit;

the pre-accessing processing unit is configured to: according to the detection result transmitted by the call type detection unit, if the call is a non-encryption conversation, not access the call; if the call is an encryption conversation, allow to access the call.

Wherein, the call type detection unit is configured to detect the call according to the following way:

if a call establishment message of the call comprises a call type and the call type is encryption, then judging the call as an encryption conversation; otherwise, judging the call as a non-encryption conversation.

The system further comprises a call type adding module in a terminal, wherein, the call type adding module is configured to: when a call is initiated, add the call type through a user—user information element (UUIE) field in the call establishment message, and when content of the UUIE field is "ENCRYPTION VOICE", that the call type is encryption is indicated.

The system further comprises a network side hardware encryption module of the network side and a terminal hardware encryption module of the terminal, wherein:

the terminal hardware encryption module is configured to: when the terminal is a terminal of sending party, use a cipher key (CK) of the sending party as an operational factor to encrypt uplink voice data, and upload the encrypted voice data to the network side; and when the terminal is a terminal of receiving party, after receiving downlink voice data, use the CK of the receiving party as the operational factor to perform the decryption on the received downlink voice data;

the network side hardware encryption module is configured to: after receiving the encrypted voice data uploaded by the sending party, and after performing the decryption by using the CK of the sending party as the operational factor, and then use the CK of the receiving party as the operational factor to encrypt the voice data, and send the encrypted voice data to the receiving party.

In order to solve the above-mentioned technical problem, the present invention further provides a network side device, comprising a pre-accessing processing unit and a call type detection unit, wherein, the call type detection unit is configured to: after receiving a conference telephone initiated by a main control party, detect a received call whose target is the main control party, and transmit a detection result to the pre-accessing processing unit;

the pre-accessing processing unit is configured to: according to the detection result transmitted by the call type detection unit, if the call is a non-encryption conversation, not access the call; if the call is an encryption conversation, allow to access the call.

Wherein, the call type detection unit is configured to detect the call according to the following way:

if a call establishment message of the call comprises a call type and the call type is encryption, then judging the call as an encryption conversation; otherwise judging the call as a non-encryption conversation.

Wherein, the call type detection unit detects the call through the call type added by a user—user information element (UUIE) field in the call establishment message, and when content of the UUIE field is "ENCRYPTION VOICE", that the call type is encryption is indicated.

The device further comprises a network side hardware encryption module, wherein:

the network side hardware encryption module is configured to: after receiving the encrypted voice data that a terminal of the sending party uses a cipher key (CK) of the sending party as an operational factor to encrypt uplink voice data and upload the encrypted voice data to the network side device, and after performing the decryption by using the CK of the sending party as the operational factor, and then use the CK of the receiving party as the operational factor to encrypt the voice data, and send the encrypted voice data to the receiving party.

The present invention provides a method, system and network side device for pre-accessing a conference telephone, thus it realizes pre-accessing the encryption conference telephone, which improves the security of the encryption conversation and also avoids the problem that the user frequently receives the interference when performing the encryption conference telephone. The technological scheme of the present invention has stronger generality and practicability. In addition, the function is mainly realized by the network side, and there are hardly more changes required to be done for the terminal except for increasing the encryption conversation type.

PREFERRED EMBODIMENTS OF THE PRESENT INVENTION

Figure 1:
FIG. 1 is a flow chart of voice encryption and decryption in the present invention.

The basic idea of the present invention lies in that a pre-accessing scheme of encrypted multiparty conversation is provided, which is based on the terminal and core network using the CK to perform the hardware encryption on the voice at the same time and realizes the pre-accessing of the encryption conference telephone, in order to guarantee the security of the conference telephone.

Based on the above-mentioned idea, the method for realizing pre-accessing the encryption conference telephone provided in the present invention adopts the following technical scheme specifically:

a network side detecting a received call whose target is the main control party after the main control party initiates an encryption conference telephone; if the call is a non-encryption conversation, then not accessing the call; if the call is an encryption conversation, then allowing to access the call.

Wherein, the main control party can be a calling terminal and also can be a called terminal.

Furthermore, the network side detects the call according to the following way:

if a call establishment message of the call comprises a call type and the call type is encryption, then judging the call as an encryption conversation; otherwise judging the call as a non-encryption conversation.

Furthermore, the call type is realized through a user—user information element (UUIE) field, and when content of the UUIE field is "ENCRYPTION VOICE", it indicates that the call type is encryption.

Furthermore, the method further includes:

after the network side allows to access the call, the main control party deciding whether to answer and join the call into this encryption conference telephone.

According to the above-mentioned method for pre-accessing the encryption conference telephone, the calling terminal provides the call type (the calling is defined when initiating the call) according to the appointment, and the network judges the call type and performs the pre-accessing processing. Wherein, the encryption conversation type can be indicated by adopting the User-User Information Element (UUIE) field, for example, it is self-defined as "ENCRYPTION VOICE". The terminal uses the UUIE field to indicate the encryption conversation type and can transmit as a carrier by SETUP signaling, and the network and the called terminal can both obtain the content of the field in order to inquire the call type. The initiating party of the conference registers the three-party conversation service in the network side at first, and after initiating the conference telephone, all incoming calls which are for the main control party are pre-processed by the network side. If judging that the call type of the incoming call is non-encryption, then the network does not access the conversation and prompts the user that the called party is on the phone and is inconvenient to answer; if judging that the call type of the incoming call is encryption, that is, the content of the UUIE field is "ENCRYPTION VOICE", then the incoming call is accessed and notified to the main control party, and then the main control party decides whether to answer and join the call in the conference telephone.

In addition, in the present invention, after entering into the Conversion state, the terminal and network side of the encryption conference telephone need to encrypt and decrypt the uplink and downlink voice data of the voice conversation, specifically including:

a calling terminal using a cipher key (CK) of a sending party as an operational factor to perform the encryption on uplink voice data, and uploading the encrypted voice data to the network side; and after the network side receives the encrypted voice data and after performing the decryption by using the CK of the sending party as the operational factor, and then using the CK of a receiving party as the operational factor to encrypt the voice data, and sending the encrypted voice data to a called terminal; the called terminal using the CK of the receiving party as the operational factor to decrypt received downlink voice data.

In order to make the objective, the technical scheme and advantage of the present invention more clear and obvious, the present invention is described in detail with reference to the accompanying drawings and in combination with embodiments hereinafter. It should be understood that the embodiment described here is only used to explain the present invention, and not to limit the present invention. It should be illustrated that, in the case of no conflicts, the embodiments in the present application and features in these embodiments can be combined with each other.

The encryption and decryption flow of the voice conversation of the encryption conference telephone used by the embodiment of the present invention is shown in FIG. 1. Since Ki, as the root cipher key of the mobile communication network, has very high confidentiality and security, so the embodiment of the present invention adopts the operational factor CK to perform the encryption and decryption on the voice data. Referring to FIG. 1, the encryption and decryption flow of the conference telephone of the present embodiment is described as follows:

the calling terminal uses the operational factor CK1 of the calling side to encrypt the gathered original data and uploads the encrypted Adaptive Multi Rate (AMR) voice data to the network, and after the network side receives the AMR voice data, it uses the same operational factor CK1 to decrypt the voice data, and then it uses the operational factor CK2 of the called party to encrypt the voice data and sends the data to the called terminal, and the called terminal uses the same operational factor CK2 to decrypt the received AMR voice data. The CK3 and CK4 in the figure are used in one reverse process, and their functions are same as the functions of CK1 and CK2. Wherein, the CK is changeable in each process of conversation establishment.

Figure 2:
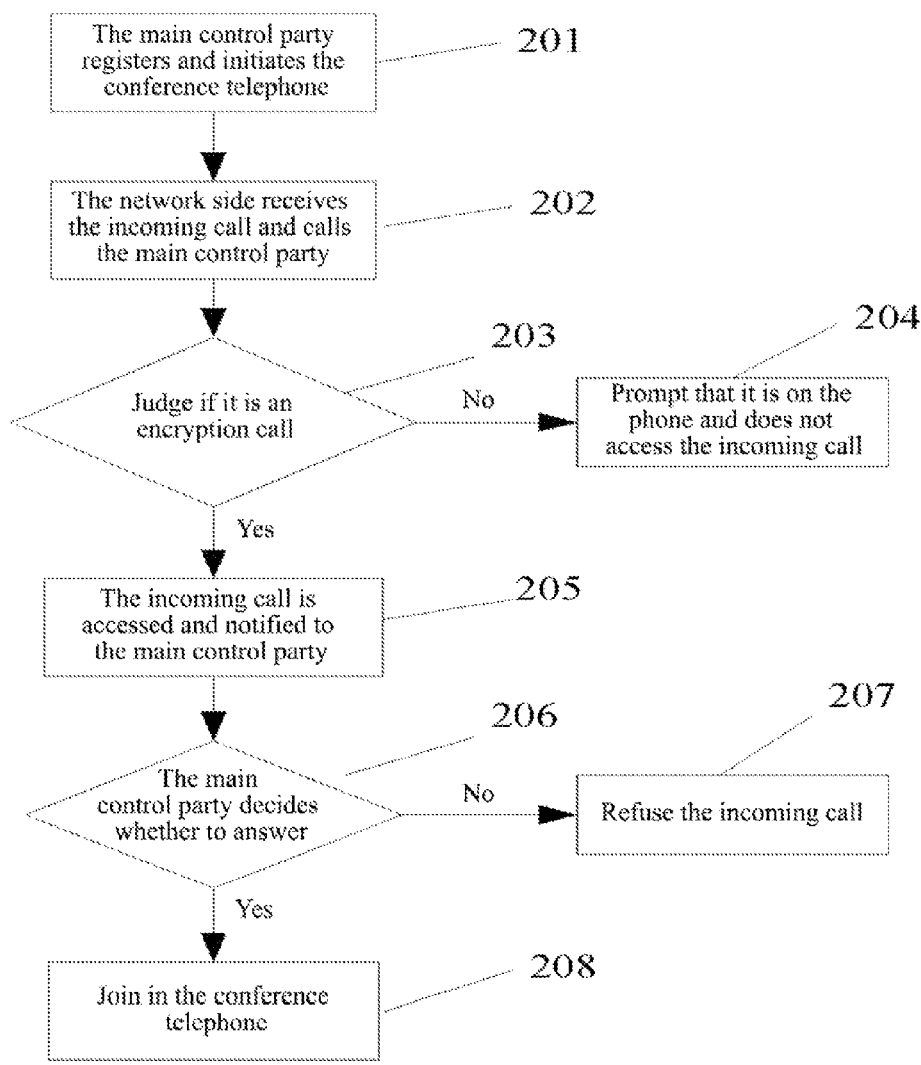
FIG. 2 is a flow diagram of realizing pre-accessing an encryption conference telephone according to an embodiment of the present invention.

FIG. 2 is a flow diagram of realizing pre-accessing an encryption conference telephone according to an embodiment of the present invention. Combining with FIG. 2, the specific steps of the flow are described as follows:

in step 201: the main control party registers the three-party conversation service at the network side, and initiates the conference telephone;

in step 202: the network side receives the incoming call, and the called user is a main control party of this conference telephone;

in step 203: the network detects the conversation type of the incoming call, which is specifically to detect whether the UUIE field is a self-defined encryption type "ENCRYPTION VOICE" in the present embodiment, if yes, step 205 is executed, if not, step 204 is executed;

in step 204: if the conversation type is the common call, then the calling user is prompted that the called party is on the phone and is inconvenient to answer, and then the incoming call ends;

in step 205: if the conversation type is the encrypted call, the incoming call is accessed and notified to the main control party of the conference telephone;

in step 206: the main control party decides whether to access the new incoming call according to the actual conditions, for example, discussing with other members of the conference telephone whether to accept it;

in step 207: the main control party answers the incoming call, and joins it into the conference telephone;

in step 208: the main control party is convenient to answer the incoming call, and refuses the incoming call directly.

According to the above-mentioned steps, it can realize the method and process described by the present invention.

The system of realizing pre-accessing the encryption conference telephone provided by the embodiment of the present invention is to configure a hardware encryption module in the terminal and the core network exchanging unit, and perform the encryption and decryption on the uplink and downlink voice data.

The terminal of sending party sends the AMR voice to the terminal hardware encryption module to perform the X encryption operation, and the CK of sending party is used as the encryption operational factor, thus obtaining the encrypted AMR voice frame and uploading the encrypted AMR voice frame to the network side;

The network side sends the encrypted voice frame and the CK of sending party to the network side hardware encryption module, and the network hardware encryption module uses the X algorithm to perform the decryption on the voice data by taking the CK of sending party as the operational factor, and then uses the X algorithm again to perform the encryption on the voice data by taking the CK of receiving party as the operational factor, and returns the operation result to the network device, and then the network device sends the encrypted voice frame to the terminal of receiving party;

The receiving party, after obtaining the downlink voice data, sends the encrypted voice data and the CK of receiving party to the terminal hardware encryption module to perform the decryption, thus obtaining the common voice frame. The following processing is the same as that of the common voice call, sending the decrypted AMR voice data to the Digital Signal Processor (DSP) and obtaining the Pulse Code Modulation (PCM) data, and sending the PCM data to the vocoder to product sound.

By adopting this kind of encryption way, it is unable to monitor at the network side, and it is equivalent to the double encryption on transmission in the wireless environment as well, which is more confidential and secure.

Specifically, the system for realizing pre-accessing an encryption conference telephone provided by the embodiment of the present invention includes a pre-accessing processing unit and a call type detection unit of a network side, wherein, the call type detection unit is configured to: after receiving a conference telephone initiated by a main control party, detect a received call whose target is the main control party, and transmit a detection result to the pre-accessing processing unit;

the pre-accessing processing unit is configured to: according to the detection result transmitted by the call type detection unit, if the call is a non-encryption conversation, not access the call; if the call is an encryption conversation, allow to access the call.

Furthermore, the call type detection unit is configured to detect the call according to the following way:

if a call establishment message of the call comprises a call type and the call type is encryption, then judging the call as an encryption conversation; otherwise judging the call as a non-encryption conversation.

Furthermore, the system further includes a call type adding module in a terminal, wherein, the call type adding module is configured to: when the call is initiated, add the call type through a user—user information element (UUIE) field in the call establishment message, and when content of the UUIE field is "ENCRYPTION VOICE", it indicates that the call type is encryption.

Furthermore, the system further includes a network side hardware encryption module and a terminal hardware encryption module, wherein:

the terminal hardware encryption module is configured to: when using a cipher key (CK) of the sending party as an operational factor to encrypt uplink voice data, and upload the encrypted voice data to the network side; and after receiving downlink voice data, use the CK of the receiving party as the operational factor to decrypt the received downlink voice data;

the network side hardware encryption module is configured to: after receiving the encrypted voice data uploaded by the sending party and after performing the decryption by using the CK of the sending party as the operational factor, then use the CK of the receiving party as the operational factor to encrypt the voice data, and send the encrypted voice data to the receiving party.

The present embodiment further provides a network side device, including a pre-accessing processing unit and a call type detection unit, wherein, the call type detection unit is configured to: after receiving a conference telephone initiated by a main control party, detect a received call whose target is the main control party, and transmit a detection result to the pre-accessing processing unit;

the pre-accessing processing unit is configured to: according to the detection result transmitted by the call type detection unit; if the call is a non-encryption conversation, not access the call; if the call is an encryption conversation, allow to access the call.

The call type detection unit is configured to detect the call according to the following way:

if a call establishment message of the call comprises a call type and the call type is encryption, judging the call as an encryption conversation; otherwise judging the call as a non-encryption conversation.

The call type detection unit detects the call through the call type added by a user—user information element (UUIE) field in the call establishment message, and when content of the UUIE field is "ENCRYPTION VOICE", it indicates that the call type is encryption.

The device further includes a network side hardware encryption module, wherein:

the network side hardware encryption module is configured to: after receiving the encrypted voice data that a terminal of the sending party uses a cipher key (CK) of the sending party as an operational factor to encrypt uplink voice data and upload the encrypted voice data to the network side device, and after performing the decryption by using the CK of the sending party as the operational factor, then use the CK of the receiving party as the operational factor to encrypt the voice data, and send the encrypted voice data to the receiving party.

The above description is only the preferred embodiments of the present invention and is not intended to limit the present invention. The present invention can have a variety of other embodiments. Those skilled in the art can make the corresponding modifications and variations according to the present invention without departing from the spirit and essence of the present invention. And all of these modifications or the variations should be included in the protection scope of the appended claims of the present invention.

It can be understood by those skilled in the art that all or part of steps in the above-mentioned method can be fulfilled by programs instructing the relevant hardware components, and the programs can be stored in a computer readable storage medium, such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limited to any specific form of the combination of the hardware and software.

INDUSTRIAL APPLICABILITY

The present invention realizes pre-accessing the encryption conference telephone, which improves the security of the encryption conversation, and also avoids the problem that the user frequently receives the interference when performing the encryption conference telephone. The technological scheme of the present invention has stronger generality and practicability. In addition, the function is mainly realized by the network side, and there are hardly more changes required to be done for the terminal except for increasing the encryption conversation type.

What we claim is:

1. A method for pre-accessing a conference telephone call, comprising:

performing, by a network side device, registration of a three-party conversation service for a main control party, and receiving, by the network side device, an encrypted conference telephone call initiated by the main control party;

initiating, by a terminal, a call whose target is the main control party, wherein the terminal adds a call type for indicating whether the call is encrypted into a call establishment message of the call to the main control party when initiating the call;

receiving and detecting, by the network side device, the call whose target is the main control party and determining, by the network side device, whether the call is an encrypted conversation according to the call type in the call establishment message, wherein if the call type is encryption, the network side device determines that the call is an encrypted conversation, otherwise the network side device determines that the call is a non-encrypted conversation;

denying, by the network side device which has registered the three-party conversation service for the main control party, access of the call to the main control party if the call is a non-encrypted conversation; and allowing, by the network side device which has registered the three-party conversation service for the main control party, access of the call to the main control party if the call is an encrypted conversation.

2. The method according to claim 1, wherein, the call type is contained in a user-user information element (UUIE) field in the call establishment message, and when content of the UUIE field is "ENCRYPTION VOICE", that the call type is encryption is indicated.

3. The method according to claim 1, further comprising:

after the encrypted conference telephone call enters a conversation state, performing, by terminals of the encrypted conference telephone call as well as by the network side device, encryption and decryption on voice data of the conversation.

4. The method according to claim 3, wherein, the step of performing encryption and decryption on voice data of the conversation comprises:

using, by a calling terminal, a cipher key (CK) of a sending party as an operational factor to encrypt uplink voice data, and uploading the encrypted voice data to the network side device;

after the encrypted voice data is received by the network side device, performing, by the network side device, decryption of the encrypted voice data by using the CK of the sending party as the operational factor, then the network side device using a CK of a receiving party as the operational factor to encrypt the voice data, and sending the encrypted voice data to a called terminal; and using, by the called terminal, the CK of the receiving party as the operational factor to decrypt received downlink voice data.

5. The method according to claim 1, further comprising:
after access of the call to the main control party is allowed by the network side device, deciding, by the main control party, whether to answer and join the call into this encrypted conference telephone call.

6. The method according to claim 2, further comprising:
after the encrypted conference telephone call enters a conversation state, performing, by terminals of the encrypted conference telephone call as well as by the network side device, encryption and decryption on voice data of the conversation.

7. A system for pre-accessing a conference telephone call, comprising a network side device and a terminal, wherein,
the network side device is configured to: perform registration of a three-party conversation service for a main control party, and receive an encrypted conference telephone call initiated by the main control party;
the terminal is configured to initiate a call whose target is the main control party, wherein the terminal adds a call type for indicating whether the call is encrypted into a call establishment message of the call to the main control party when initiating the call; and
the network side device is configured to: receive and detect the call whose target is the main control party and determine whether the call is an encrypted conversation according to the call type in the call establishment message, wherein if the call type is encryption, determine that the call is an encrypted conversation, otherwise determine that the call is a non-encrypted conversation;
wherein the network side device which has registered the three-party conversation service for the main control party denies access of the call to the main control party if the call is a non-encrypted conversation, and allows access of the call to the main control party if the call is an encrypted conversation.

8. The system according to claim 7, wherein,
the terminal is configured to: when initiating the call, add the call type in a user-user information element (UUIE) field in the call establishment message, and when content of the UUIE field is "ENCRYPTION VOICE", that the call type is encryption is indicated.

9. The system according to claim 7, wherein the network side device includes a network side hardware encryption module and the terminal includes a terminal hardware encryption module, wherein:
the terminal hardware encryption module is configured to: when the terminal is a terminal of a sending party, use a cipher key (CK) of the sending party as an operational factor to encrypt uplink voice data, and upload the encrypted voice data to the network side; and when the terminal is a terminal of a receiving party, after receiving downlink voice data, use a CK of the receiving party as the operational factor to perform the decryption on the received downlink voice data;
the network side hardware encryption module is configured to: after receiving the encrypted voice data uploaded by the sending party, perform decryption of the encrypted voice data by using the CK of the sending party as the operational factor, then use the CK of the receiving party as the operational factor to encrypt the voice data, and send the encrypted voice data to the receiving party.

10. The system according to claim 8, wherein the network side device includes a network side hardware encryption module and the terminal includes a terminal hardware encryption module, wherein:
the terminal hardware encryption module is configured to: when the terminal is a terminal of a sending party, use a cipher key (CK) of the sending party as an operational factor to encrypt uplink voice data, and upload the encrypted voice data to the network side; and when the terminal is a terminal of a receiving party, after receiving downlink voice data, use a CK of the receiving party as the operational factor to perform the decryption on the received downlink voice data;
the network side hardware encryption module is configured to: after receiving the encrypted voice data uploaded by the sending party, perform decryption of the encrypted voice data by using the CK of the sending party as the operational factor, then use the CK of the receiving party as the operational factor to encrypt the voice data, and send the encrypted voice data to the receiving party.

11. A network side device, comprising a processor, wherein,
the processor is configured to: perform registration of a three-party conversation service for a main control party, and receive an encrypted conference telephone call initiated by the main control party; and
when a terminal initiates a call whose target is the main control party, wherein the terminal adds a call type for indicating whether the call is encrypted into a call establishment message of the call to the main control party when initiating the call, the processor is configured to: receive and detect the call whose target is the main control party and determine whether the call is an encrypted conversation according to the call type in the call establishment message, wherein if the call type is encryption, determine that the call is an encrypted conversation, otherwise determine that the call is a non-encrypted conversation;
wherein the network side device which has registered the three-party conversation service for the main control party denies access of the call to the main control party if the call is a non-encrypted conversation, and allows access of the call to the main control party if the call is an encrypted conversation.

12. The device according to claim 11, wherein,
the call type is contained in a user-user information element (UUIE) field in the call establishment message, and when content of the UUIE field is "ENCRYPTION VOICE", that the call type is encryption is indicated.

13. The device according to claim 11, further comprising a network side hardware encryption module, wherein:
the network side hardware encryption module is configured to: after receiving encrypted voice data that is encrypted by a terminal of a sending party by using a cipher key (CK) of the sending party as an operational factor and uploaded to the network side device, perform decryption of the encrypted voice data by using the CK of the sending party as the operational factor, then use a CK of a receiving party as the operational factor to encrypt the voice data, and send the encrypted voice data to the receiving party.

14. The device according to claim 12, further comprising a network side hardware encryption module, wherein:

the network side hardware encryption module is configured to: after receiving encrypted voice data that is encrypted by a terminal of a sending party by using a cipher key (CK) of the sending party as an operational factor and uploaded to the network side device, perform decryption of the encrypted voice data by using the CK of the sending party as the operational factor, then use a CK of a receiving party as the operational factor to encrypt the voice data, and send the encrypted voice data to the receiving party.

* * * * *